United States Patent
Yamanouchi

(10) Patent No.: US 9,888,155 B2
(45) Date of Patent: Feb. 6, 2018

(54) IMAGE PROCESSING APPARATUS

(71) Applicant: Oki Data Corporation, Tokyo (JP)

(72) Inventor: Katsuyoshi Yamanouchi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/214,594

(22) Filed: Jul. 20, 2016

(65) Prior Publication Data

US 2017/0034399 A1 Feb. 2, 2017

(30) Foreign Application Priority Data

Jul. 28, 2015 (JP) ................................ 2015-148957

(51) Int. Cl.
*H04N 1/62* (2006.01)
*H04N 1/60* (2006.01)

(52) U.S. Cl.
CPC ............. *H04N 1/62* (2013.01); *H04N 1/6008* (2013.01); *H04N 1/622* (2013.01)

(58) Field of Classification Search
None
See application file for complete search history.

(56) References Cited

U.S. PATENT DOCUMENTS

| | | | | |
|---|---|---|---|---|
| 4,974,067 A * | 11/1990 | Suzuki | ........... | H04N 1/52 358/534 |
| 5,138,465 A * | 8/1992 | Ng | ............ | H04N 1/38 358/448 |
| 5,631,748 A * | 5/1997 | Harrington | ........... | H04N 1/52 347/251 |
| 6,185,002 B1 * | 2/2001 | Askeland | ........... | G06K 15/107 358/1.1 |
| 6,637,860 B1 * | 10/2003 | Madeley | ........... | B41J 13/226 347/13 |
| 8,675,248 B2 * | 3/2014 | Matsushita | ........... | G03G 15/36 358/1.15 |
| 9,633,287 B2 * | 4/2017 | Kawabata | ........... | G06K 15/025 |
| 2003/0007164 A1 * | 1/2003 | Lee | ........... | H04N 1/54 358/1.9 |
| 2003/0197749 A1 * | 10/2003 | Kawakami | ........... | H04N 1/6097 347/15 |
| 2004/0100658 A1 * | 5/2004 | Kanda | ........... | H04N 1/6022 358/1.18 |
| 2005/0150411 A1 * | 7/2005 | Bestmann | ........... | H04N 1/54 101/484 |
| 2005/0226498 A1 * | 10/2005 | Lee | ........... | H04N 1/405 382/162 |

(Continued)

FOREIGN PATENT DOCUMENTS

JP 09-179703 7/1997

*Primary Examiner* — Madelein Nguyen
(74) *Attorney, Agent, or Firm* — Panitch Schwarze Belisario & Nadel LLP

(57) ABSTRACT

An image processing apparatus includes a data acquiring circuitry and an image generating circuitry. The data acquiring circuitry acquires image formation data that includes an image of a process color as a process color image and an image of a spot color as a spot color image. The image generating circuitry detects, from the image formation data acquired by the data acquiring circuitry, an overlapped region in which a region of the process color image and a region of the spot color image are overlapped with each other, and generates a first process color image from an image of the overlapped region.

5 Claims, 16 Drawing Sheets

(56) References Cited

U.S. PATENT DOCUMENTS

| | | | |
|---|---|---|---|
| 2005/0231576 A1* | 10/2005 | Lee .................... | H04N 1/56 347/100 |
| 2005/0243374 A1* | 11/2005 | Nishide ............... | H04N 1/52 358/2.1 |
| 2005/0280847 A1* | 12/2005 | Cairns ................ | H04N 1/6011 358/1.9 |
| 2007/0026586 A1* | 2/2007 | Kim .................... | H01L 27/1288 438/152 |
| 2007/0121131 A1* | 5/2007 | Hauser ................ | G06K 15/02 358/1.9 |
| 2008/0158281 A1* | 7/2008 | Saito .................. | H04N 1/60 347/15 |
| 2012/0262740 A1* | 10/2012 | Yamada .............. | H04N 1/628 358/1.9 |
| 2013/0250322 A1* | 9/2013 | Kawabata ........... | H04N 1/60 358/1.9 |
| 2015/0158317 A1* | 6/2015 | Simoni ................ | G03F 3/10 101/211 |
| 2015/0220819 A1* | 8/2015 | Yamamoto .......... | G06K 15/027 358/1.9 |
| 2015/0262046 A1* | 9/2015 | Hayakawa .......... | G06F 3/12 358/3.24 |
| 2015/0332132 A1* | 11/2015 | Inamura ............. | H04N 1/603 358/1.9 |
| 2015/0347880 A1* | 12/2015 | Das .................... | G06K 15/1826 358/3.24 |
| 2016/0028921 A1* | 1/2016 | Thrasher ............ | H04N 1/4092 358/519 |
| 2016/0198064 A1* | 7/2016 | Bai .................... | H04N 1/54 382/100 |
| 2017/0266981 A1* | 9/2017 | Chang ................ | B41J 2/2103 |

\* cited by examiner

```
%!PS-Adobe-3.0
(SNIP)
/OK@TokushokuKasanari true def      ~501
(SNIP)
<</ProcessColorModel (DeviceN)
/SeparationColorNames[(Cyan) (Magenta) (Yellow) (Black) (Special_White)]    ~502
/SepatationOrder [(Cyan) (Magenta) (Yellow) (Black) (Special_White)]
>> setpagedevice
(SNIP)
/DeviceCMYK setcolorspace     ~503
(SNIP) (PROCESS COLOR DRAWING DATA)
                               ~504
True setoverprint
[/Separation(Special_White)/DeviceCMYK[0 0 0]] setcolorspace 1      ~505
Setcolor
(SNIP) (SPOT COLOR DRAWING DATA)
                               ~506
False setoverprint
(SNIP)
```

IMAGE PROCESSING APPARATUS

CROSS REFERENCE TO RELATED APPLICATIONS

This application claims the benefit of Japanese Priority Patent Application JP 2015-148957 filed on Jul. 28, 2015, the entire contents of which are incorporated herein by reference.

BACKGROUND

The invention relates to an image processing apparatus.

Various measures to obtain a composite image have been proposed. For example, Japanese Unexamined Patent Application Publication No. H09-179703 proposes a measure to combine a background image and an overlay image.

SUMMARY

What is desired in an image processing apparatus is to allow for, with ease at low cost, confirmation of a finished state when a spot color is added to process color.

It is desirable to provide an image processing apparatus that allows for confirmation of a finished state when a spot color is added to process color, with ease at low cost.

An image processing apparatus according to an embodiment of the invention includes: a data acquiring circuitry that acquires image formation data, in which the image formation data includes an image of a process color as a process color image and an image of a spot color as a spot color image; and an image generating circuitry that detects, from the image formation data acquired by the data acquiring circuitry, an overlapped region in which a region of the process color image and a region of the spot color image are overlapped with each other, and generates a first process color image from an image of the overlapped region.

BRIEF DESCRIPTION OF THE DRAWINGS

FIG. 2 is a diagram illustrating an example of print data.

DETAILED DESCRIPTION

Figure 1:
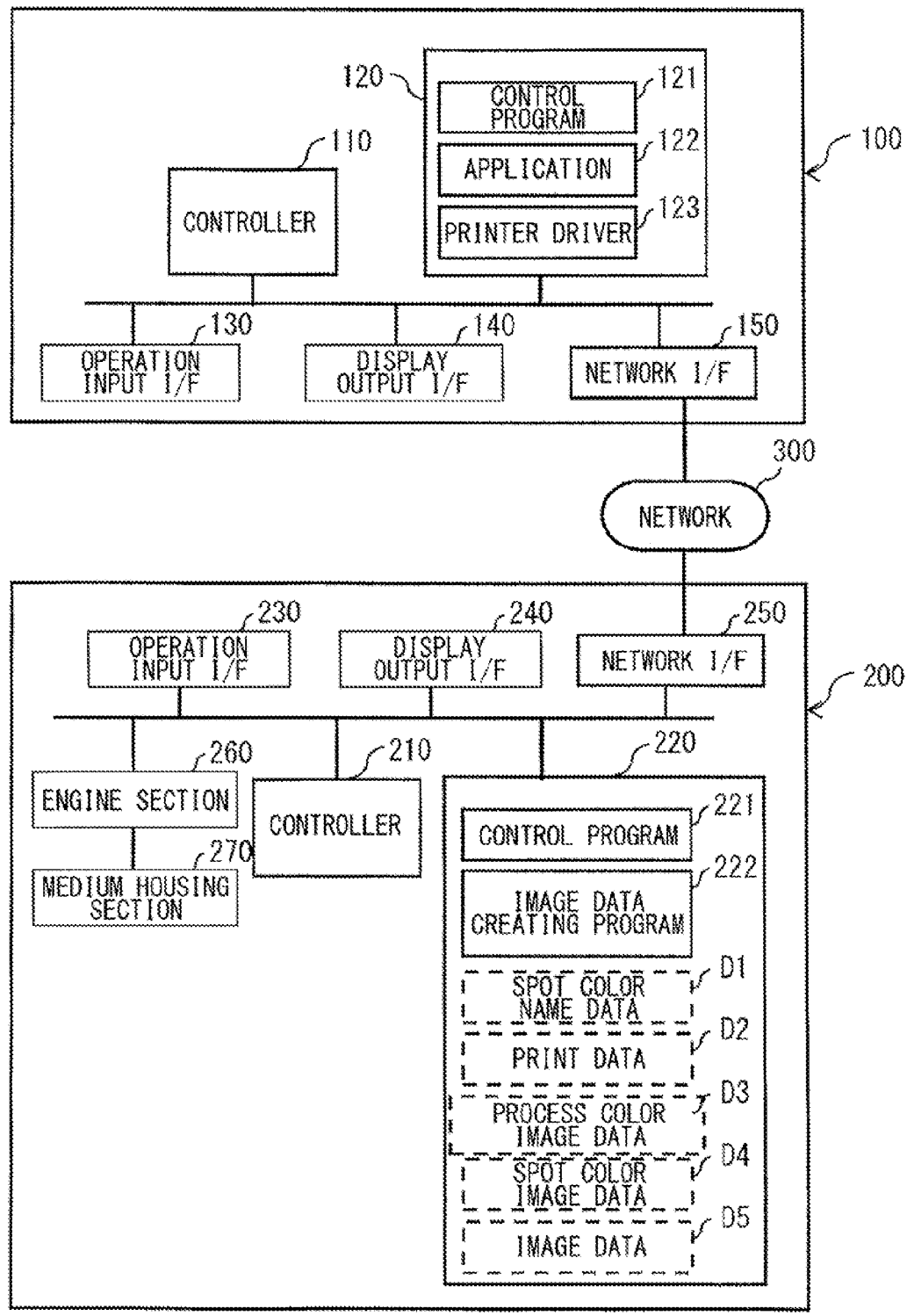
FIG. 1 is a diagram illustrating an example of an outline configuration of an image processing system.

Hereinafter, some example embodiments of the invention are described in detail with reference to drawings. The following description is a specific but non-limiting example of the invention, and the invention is not limited to the following embodiments. In addition, arrangement, dimensions, dimension ratio, etc. of the respective components illustrated in the drawings of the invention are also not limited to those described below.

There is a printing method in which a spot color is added to a process color to provide a special effect on a print output. The process color refers to color representation by combination of basic colors (for example, CMYK colors, RGB colors, and monochrome colors), and a color represented in such a manner, in a printed matter. The spot color refers to color representation by previously-prepared ink (for example, a clear color, a white color, a gold color, and a silver color), and a color represented in such a manner.

To add a spot color to a process color, for example, it is necessary to explicitly specify a spot color to create print data with use of, for example, a desktop publishing (DTP) application. In the DTP application, however, operation is not easy and a finished state is not confirmed on a screen in most cases. Therefore, a user performs test printing and confirms the finished state visually. The test printing not only takes time and effort but it also consumes an expensive spot color in addition to a lot of trouble. Also, it is necessary to prepare a printing apparatus provided with a specified spot color in order to perform the test printing. When the user does not have such a printing apparatus at hand, it is necessary for the user to go off to a place where such a printing apparatus is installed. Further, in a case of overprinting, when a spot color is used as ground of a process color, it is necessary to use a transparent film as a print medium in order to confirm the spot color serving as the ground. Accordingly, it takes time and effort as well as cost to perform confirmation of the finished state when a spot color is added to a process color.

1. First Embodiment

[Configuration]

FIG. 1 illustrates an example of an outline configuration of an image processing system. The image processing system includes a host computer 100, and a printer 200. The host computer 100 may be configured of a device such as a personal computer and a mobile terminal. The printer 200 corresponds to an "image processing apparatus" in one embodiment of the invention. The host computer 100 and the printer 200 are coupled to each other through a network 300. The network 300 may be, for example, a communication line such as LAN and WAN. The host computer 100 may be communicatable with the printer 200 through the network 300. The printer 200 may be communicatable with the host computer 100 through the network 300.

[Printer 200]

The printer 200 has a function of performing printing, based on print data D2 supplied from the host computer 100. The printer 200 may include, for example, a controller 210, a memory section 220, an operation input interface (I/F) 230, a display output I/F 240, a network I/F 250, an engine section 260, and a medium housing section 270. The controller 210 corresponds to a "data acquiring circuitry" and an "image generating circuitry" in one embodiment of the invention.

The network I/F 250 communicates with an external apparatus such as the host computer 100 through the network 300. The network I/F 250 transfers, to the controller 210, various kinds of requests (for example, connection request and printing request) received from the external apparatus such as the host computer 100. The network I/F 250 transmits various kinds of responses (for example, connection response and printing response) from the controller 210 to the external apparatus such as the host computer 100. When receiving the print data D2 from the external apparatus such as the host computer 100, the network I/F 250 transfers the received print data D2 to the controller 210. The operation input I/F 230 receives various kinds of inputs (for example, execution instruction and data input) from a user. The display output I/F 240 may be, for example, a display module.

The memory section 220 may store, for example, programs and data used for printing. Also, for example, information supplied from the external apparatus such as the host computer 100 may be stored in the memory section 220. The memory section 220 may be configured of a non-volatile memory such as an EEPROM, a flash memory, and a variable resistance memory.

For example, as illustrated in FIG. 1, the memory section 220 may store a control program 221 and an image data creating program 222. The control program 221 may be a program controlling the entire printer 200. The image data creating program 222 may be a program creating image data D5, based on input (the print data D2 described later) through the network I/F 250.

For example, as illustrated in FIG. 1, pieces of data such as spot color name data D1, the print data D2, process color image data D3, spot color image data D4, and the image data D5 may be stored in the memory section 220. These pieces of data may be acquired by execution of the image data creating program 222. The print data D2 corresponds to an "image formation data" in one embodiment of the invention. The process color image data D3 corresponds to a "process color image" in one embodiment of the invention. The spot color image data D4 corresponds to a "spot color image" in one embodiment of the invention. The image data D5 corresponds to a "first process color image", a "second process color image", and a "third process color image" in one embodiment of the invention.

The spot color name data D1 may be a name of a spot color to be used in the print data D2, and for example, may be acquired by being inputted in an input window 442 of a printer driver UI screen 400 described later. The process color as used herein refers to, in a printed matter, color representation by combination of basic colors (for example, CMYK colors, RGB colors, or monochrome colors), or colors represented in such a manner. The process color may be a color represented by one or more of, for example, cyan, magenta, yellow, and black. The spot color as used herein refers to color representation by a previously-prepared ink (for example, a clear color, a white color, a gold color, and a silver color), or colors represented in such a manner. The spot color may be, for example, a color that is represented by one or a plurality of colors that are out of color reproduction range by the process colors.

FIG. 2 illustrates an example of the print data D2. The print data D2 may be data supplied from the external apparatus such as the host computer 100. For example, as illustrated in FIG. 2, the print data D2 may be described in PostScript language. A command 501 in FIG. 2 declares execution of confirmation printing of spot color overlapping. Note that the contents of the command 501 exemplified in FIG. 2 are illustrated as an example for the description purpose, and may be different from those of an actual command. A command 502 in FIG. 2 specifies the process colors and the spot colors to be used in the print data D2. The command 502 in FIG. 2 specifies, as the process colors, cyan, magenta, yellow, and black, and specifies special white as the spot color. Note that the contents of the command 502 exemplified in FIG. 2 are illustrated as an example for the description purpose, and may be different from those of an actual command.

A command 503 in FIG. 2 declares that the process colors are to be used in drawing. Therefore, the command 503 may be followed by drawing data of the process colors. A command 504 in FIG. 2 declares execution of overprinting. In other words, the drawing data (drawing data of the spot color) described thereafter may be specified to overprinting by the command 504 in FIG. 2. Here, the overprinting is a term commonly used in DTP printing, and means that, when a new image is to be drawn, an image drawn in advance (so-called base image) in a new drawing region is stored and then the new image is drawn. Note that there is a knockout method as a method contrary to the overprinting method. The knockout means that the image drawn in advance (so-called ground image) in a new drawing region is negated by (updated with) a new image.

A command 505 in FIG. 2 declares that the spot color is to be used in drawing. Therefore, the command 503 may be followed by drawing data of the spot color. A command 506 in FIG. 2 declares cancellation of the overprinting. In other words, the drawing data may be specified to the normal knockout method thereafter, by the command 506 in FIG. 2.

The print data D2 may further include a header relating to print setting. For example, the header may include "information indicating whether to perform confirmation printing of spot color overlapping" that is inputted, through an operation input I/F 130 described later, at the time when the printer driver UI screen 400 described later is displayed on a screen of the host computer 100. The header may further include "spot color name" that is inputted, through the operation input I/F 130, at the time when the printer driver UI screen 400 is displayed on the screen of the host computer 100.

The process color image data D3 may be image data of the process colors. The process color image data D3 may be image data corresponding to print data of the process colors extracted from the print data D2, or image data of the process colors extracted from the image data corresponding to the print data D2. The spot color image data D4 may be image data of the spot colors. The spot color image data D4 may be image data corresponding to print data of the spot colors extracted from the print data D2, or image data of the spot colors extracted from the image data corresponding to the print data D2. The process color image data D3 and the spot color image data D4 may be overprinting data or knockout data.

The image data D5 may be image data (hereinafter, simply referred to as "confirmation image data") to confirm one or both of an "overlapped region α" (described later) between the process color image data D3 and the spot color image data D4 and a "non-overlapped region β" (described later) between the process color image data D3 and the spot color image data D4. Alternatively, the image data D5 may be normal image data (hereinafter, simply referred to as "normal image data") corresponding to the print data D2. The overlapped region α corresponds to an "overlapped region" in one embodiment of the invention. The non-overlapped region β corresponds to a "non-overlapped region" in one embodiment of the invention.

When the image data D5 is the confirmation image data, overlapping the process color image data D3 and the spot color image data D4 with each other generates the image data D5. In a case where the image data D5 is the confirmation image data, the image data D5 may be represented by a plurality of process colors, a process color with a plurality of density, a process color with a plurality of patterns, or any combination thereof to allow one or a plurality of overlapped regions α to be distinguished from one another or to allow one or a plurality of non-overlapped regions β to be distinguished from one another. The procedure of creating the confirmation image data D5 and specific display modes of the confirmation image data D5 are to be described in detail later.

The control program 221 and the image data creating program 222 may be loaded to the controller 210. The control program 221 may be loaded to the controller 210, allowing the controller 210 to perform a series of operation described in the loaded control program 221. The image data creating program 222 may be loaded to the controller 210, allowing the controller 210 to perform a series of operation described in the loaded image data creating program 222.

When the control program 221 is loaded to the controller 210, the controller 210 controls the entire printer 200. More specifically, the controller 210 receives various kinds of requests (for example, connection request and printing request) from the external apparatus such as the host computer 100 through the network I/F 250. The controller 210 generates various kinds of response data (for example, connection response and printing response) in accordance with the requests from the external apparatus such as the host computer 100. The controller 210 transmits the various kinds of generated responses to the external apparatus such as the host computer 100 through the network I/F 250.

When the image data creating program 222 is loaded to the controller 210, the controller 210 receives the print data D2 from the external apparatus such as the host computer 100 through the network I/F 250. The controller 210 generates the image data D5 from the received print data D2. For example, the controller 210 may transfer the generated image data D5 to the engine section 260 and instructs the engine section 260 to perform printing that is based on the transferred data. The engine section 260 performs the printing that is based on the image data D5 in response to the printing instruction from the controller 210. The medium housing section 270 stores a medium on which the image data D5 is to be printed. For example, the controller 210 may generate display screen data including the generated image data D5, and may transfer the generated display screen data to the display output I/F 240. The display output I/F 240 performs screen display, based on the display screen data (the image data D5) provided from the controller 210.

Figure 3:
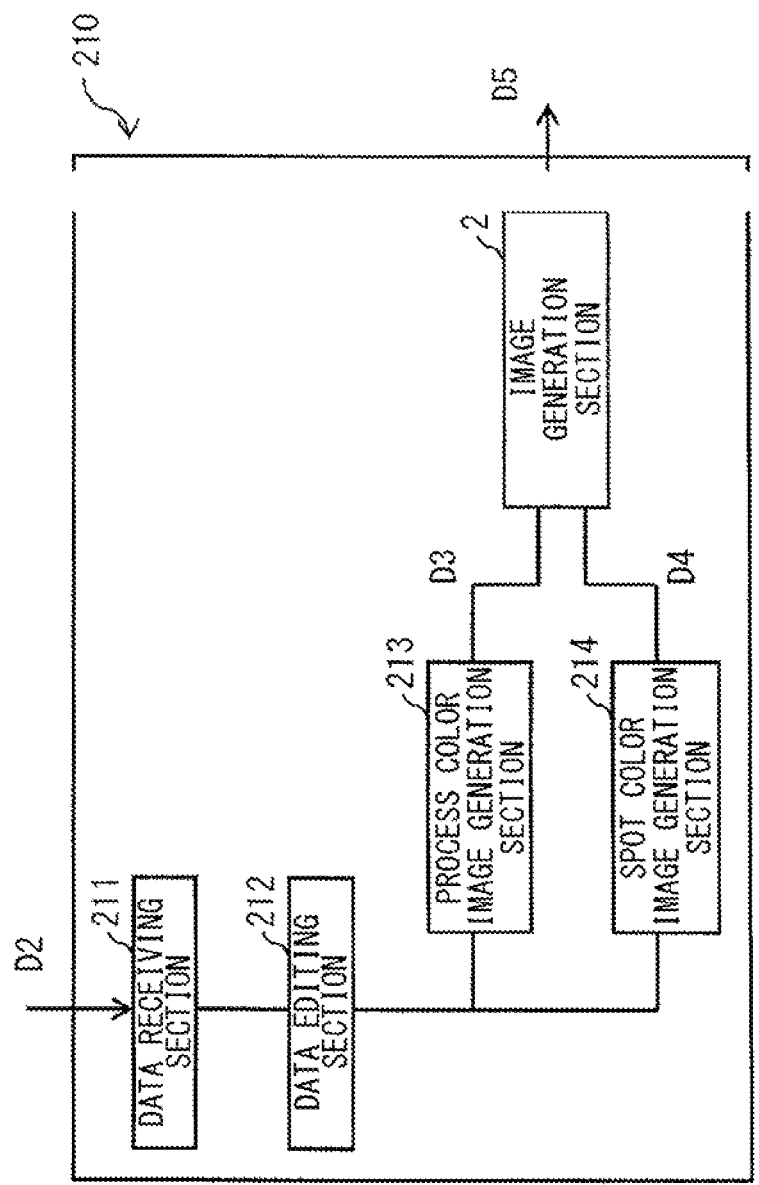
FIG. 3 is a diagram illustrating a configuration example of a functional block of a controller of a printer.

FIG. 3 illustrates a configuration example of the functional block of the controller 210. For example, as illustrated in FIG. 3, the controller 210 may include a data receiving section 211, a data editing section 212, a process color image generation section 213, a spot color image generation section 214, and an image generation section 215.

The data receiving section 211 receives the print data D2 transmitted from the external apparatus such as the host computer 100, and then stores the received print data D2 in the memory section 220. The data receiving section 211 informs the data editing section 212 of storage of the print data D2 in the memory section 220.

Figure 4:
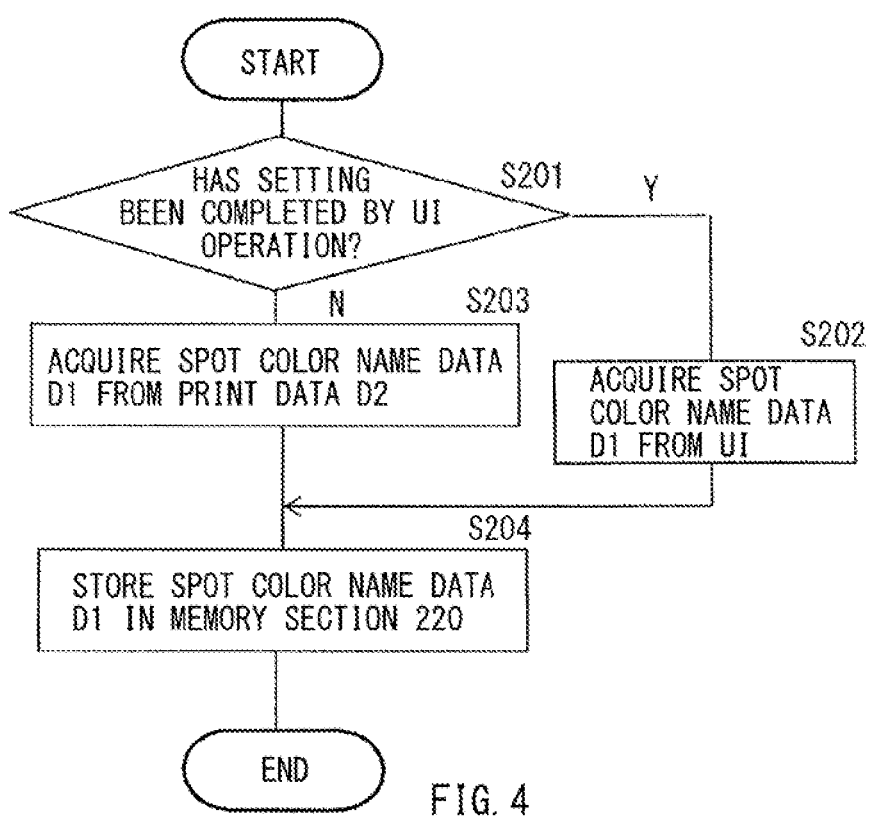
FIG. 4 is a diagram illustrating an example of a procedure of acquiring a name of a spot color.

The data editing section 212 reads out the print data D2 from the memory section 220 in response to notification from the data receiving section 211. The data editing section detects whether "information indicating whether to perform confirmation printing of spot color overlapping" and "spot color name" have been set through operation on the printer driver UI screen 400 (step S201 in FIG. 4). More specifically, the data editing section 212 detects whether the header of the print data D2 read out from the memory section 220 includes "information indicating whether to perform confirmation printing of spot color overlapping" and "spot color name". When detecting that the header of the print data D2 includes "information indicating whether to perform confirmation printing of spot color overlapping" and "spot color name", the data editing section 212 acquires "spot color name" (spot color name data D1) from the header of the print data D2 (step S202 in FIG. 4). When detecting that the header of the print data D2 includes "information indicating whether to perform confirmation printing of spot color overlapping" but not detecting that the header of the print data D2 includes "spot color name", the data editing section 212 detects whether the body of the print data D2 includes the command 505 described in FIG. 2. When detecting that the body of the print data D2 includes the command 505 described in FIG. 2, the data editing section 212 acquires "spot color name" (the spot color name data D1) from the command 505 described in FIG. 2 (step S203 in FIG. 4). The data editing section 212 stores, in the memory section 220, the spot color name data D1 acquired from the print data D2 in the above-described manner (step S204 in FIG. 4).

The data editing section 212 further detects whether the print data D2 includes a special color of drawing data. The data editing section 212 detects whether the print data D2 includes the command 503 and the command 505 described in FIG. 2, for example.

When detecting a process color as the special color in the print data D2, the data editing section 212 extracts the drawing data of the process color from the print data D2 and provides the extracted drawing data to the process color image generation section 213. At this time, the data editing section 212 also provides information indicating whether to perform overprinting, to the process color image generation section 213.

When detecting that the print data D2 includes the command 503 described in, for example, FIG. 2, the data editing section 212 extracts, as the drawing data of the process color, the drawing data described right after the command 503 described in FIG. 2, and provides the extracted drawing data to the process color image generation section 213. At this time, if detecting that the print data D2 includes the command 504 described in FIG. 2, the data editing section 212 provides, together with the drawing data, information that "overprinting is specified" to the process color image generation section 213.

When detecting the spot color as the special color in the print data D2, the data editing section 212 extracts the drawing data of the spot color from the print data D2, and provides the extracted drawing data to the spot color image generation section 214. At this time, the data editing section 212 also provides presence or absence of overprinting, to the image generation section 213.

When detecting that the print data D2 includes the command 505 described in, for example, FIG. 2, the data editing section 212 extracts, as the drawing data of the spot color, the drawing data described right after the command 505 described in FIG. 2, and provides the extracted drawing data to the spot color image generation section 214. At this time, if detecting that the print data D2 includes the command 504 described in FIG. 2, the data editing section 212 provides information that "overprinting is specified" together with the drawing data, to the spot color image generation section 214.

Figure 5:
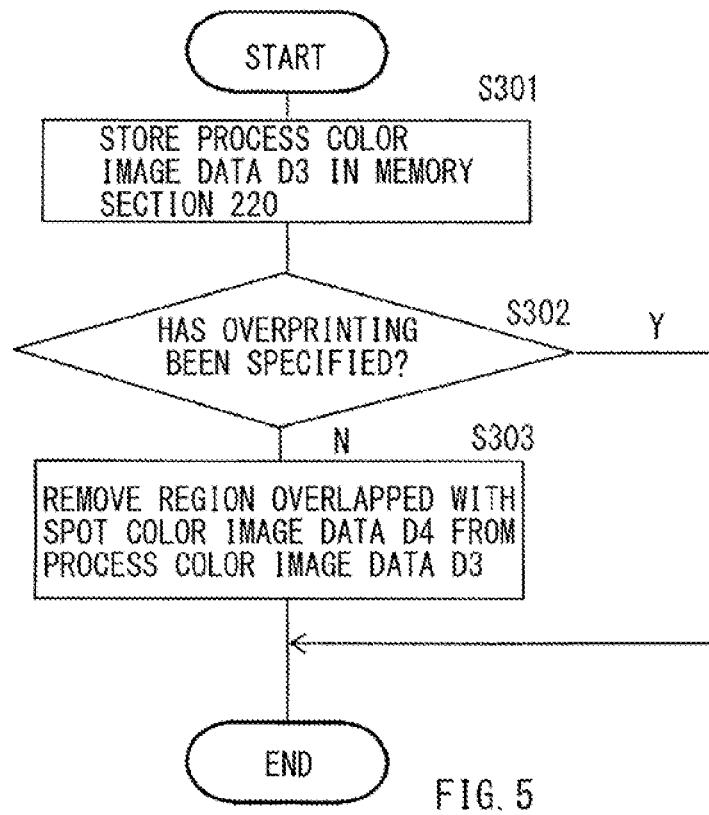
FIG. 5 is a diagram illustrating an example of a procedure of drawing a process color image.

When acquiring the drawing data from the data editing section 212, the process color image generation section 213 generates image data corresponding to the acquired image data, and stores the generated image data as process color image data D3 in the memory section 220 (step S301 in FIG. 5). At this time, the process color image generation section 213 detects whether the information that "overprinting is specified" is provided (step S302 in FIG. 5). When detecting that the information that "overprinting is specified" has been provided, the process color image generation section 213 provides the generated image data as the process color image data D3 to the image generation section 215.

Figure 6:
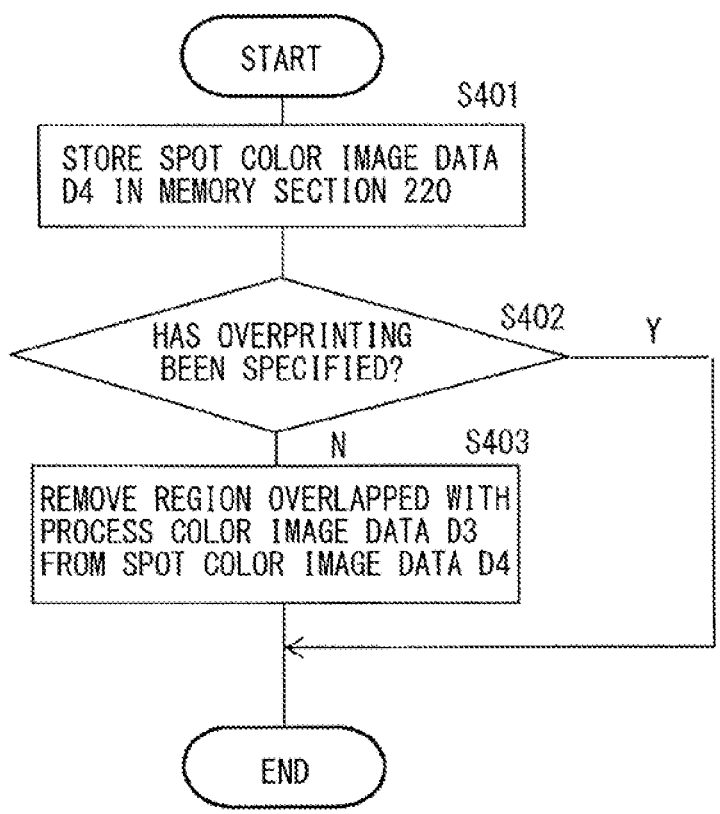
FIG. 6 is a diagram illustrating an example of a procedure of drawing a spot color image.

When acquiring the drawing data from the data editing section 212, the spot color image generation section 214 generates image data corresponding to the received drawing data, and stores the generated image data as spot color image data D4 in the memory section 220 (step S401 in FIG. 6). At this time, the spot color image generation section 214 detects whether the information that "overprinting is specified" has been provided (step S402 in FIG. 6). When detecting that the information that "overprinting is specified" has been provided, the spot color image generation section 214 provides the generated image data as the spot color image data D4 to the image generation section 215.

Figure 7:
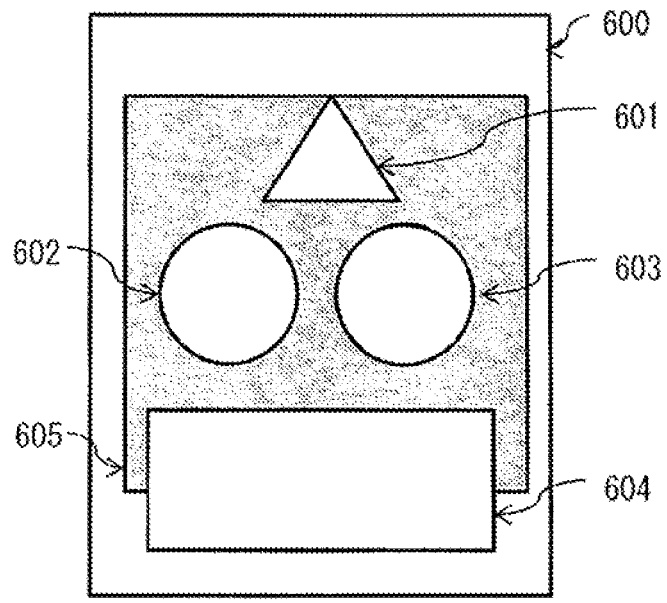
FIG. 7 is a diagram illustrating an example of normal image data.
Figure 8:
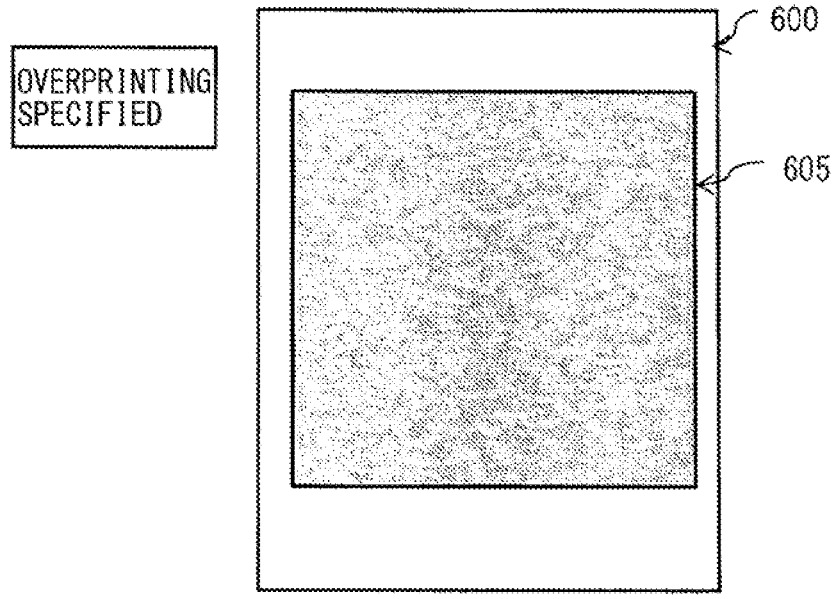
FIG. 8 is a diagram illustrating an example of process color image data.
Figure 9:
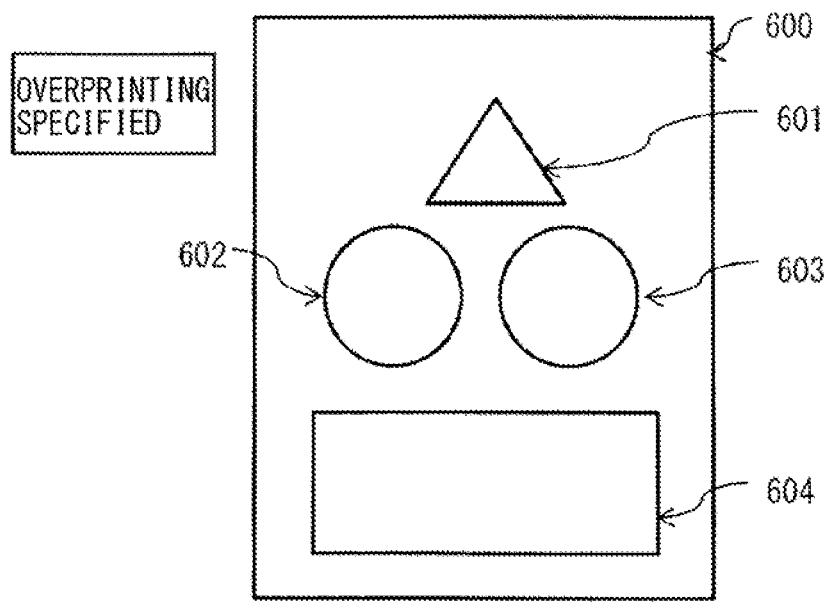
FIG. 9 is a diagram illustrating an example of spot color image data.

For example, it may be assumed that the normal image data D5 corresponding to the print data D2 is formed, for example, as illustrated in FIG. 7. The normal image data D5 may include, for example, in a print region 600, a square process color image 605, a triangular spot color image 601, a circular spot color image 602, a circular spot color image 603, and a rectangular spot color image 604. When the process color image 605 and the spot color images 601, 602, 603, and 604 are to be printed in the overprinting method, the process color image 605 may be the ground of the spot color images 601, 602, 603, and 604, and the spot color images 601, 602, 603, and 604 may be disposed to be in contact with a top surface of the process color image 605. Therefore, the process color image data D3 at this time may be formed of the square process color image 605, for example, as illustrated in FIG. 8. Also, the spot color image data D4 at this time may be formed of the triangular spot color image 601, the circular spot color image 602, the circular spot color image 603, and the rectangular spot color image 604, for example, as illustrated in FIG. 9.

When it is not detected that the information that "overprinting is specified" has been provided, the process color image generation section 213 first reads out the spot color image data D4 from the memory section 220. The process color image generation section 213 then removes a region overlapped with the spot color image data D4 from the process color image data D3 (step S303 in FIG. 5). More specifically, the process color image generation section 213 removes, from the process color image data D3, gradation data at coordinates that are common between coordinates of a plurality of pixels each including gradation data out of pixels configuring the process color image data D3 and coordinates of a plurality of pixels each including gradation data out of pixels configuring the spot color image data D4.

When it is not detected that the information that "overprinting is specified" has been provided, the spot color image generation section 214 first reads out the process color image data D3 from the memory section 220. The process color image generation section 213 then removes, from the spot color image data D4, a region overlapped with the process color image data D3 (step S403 in FIG. 6). More specifically, the spot color image generation section 214 removes, from the spot color image data D4, gradation data at coordinates that are common between coordinates of a plurality of pixels each including gradation data out of pixels configuring the process color image data D3 and coordinates of a plurality of pixels each including gradation data out of pixels configuring the spot color image data D4.

Then, finally, the process color image generation section 213 stores (overwrites), in the memory section 220, the process color image data D3 from which the region overlapped with the spot color image data D4 has been removed. The spot color image generation section 214 stores (overwrites), in the memory section 220, the spot color image data D4 from which the region overlapped with the process color image data D3 has been removed.

Figure 10:
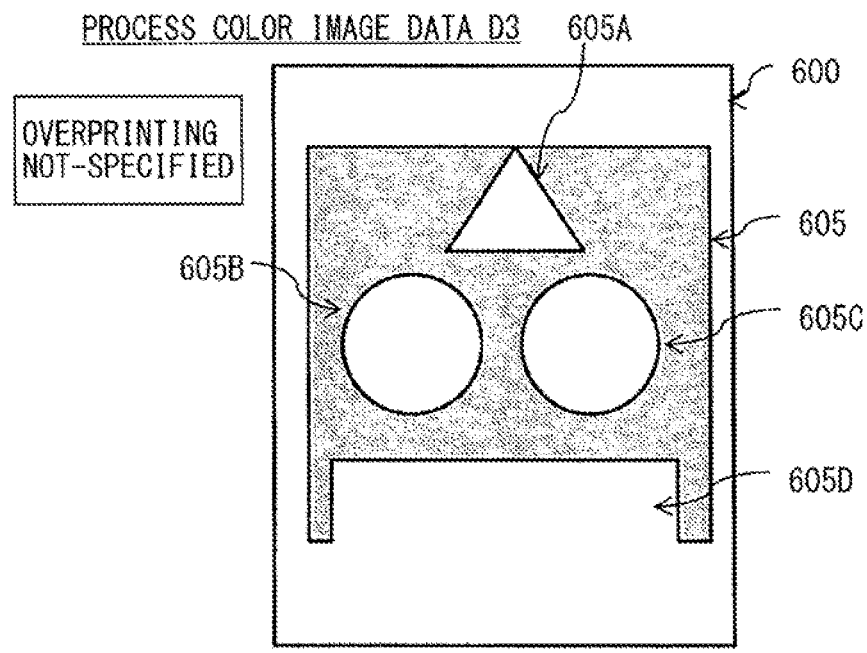
FIG. 10 is a diagram illustrating an example of the process color image data.

For example, it may be assumed that the normal image data D5 corresponding to the print data D2 is formed, for example, as illustrated in FIG. 7. The normal image data D5 may include, for example, in the print region 600, the square process color image 605, the triangular spot color image 601, the circular spot color image 602, the circular spot color image 603, and the rectangular spot color image 604. When the process color image 605 and the spot color images 601, 602, 603, and 604 are to be printed in the knockout method, the process color image 605 may not be the ground of the spot color images 601, 602, 603, and 604. The process color image 605 has a sheet shape in which openings 605A, 605B, and 605C are formed at positions opposed to the spot color images 601, 602, and 603, and a cutout 605D is formed at a position opposed to a part of the spot color image 604. Therefore, the process color image data D3 at this time may be formed of the sheet process color image 605 in which the openings 605A, 605B, and 605C are formed at the positions opposed to the spot color images 601, 602, and 603 and the cutout 605D is formed at the position opposed to a part of the spot color image 604, for example, as illustrated in FIG. 10. Also, the spot color image data D4 at this time may be formed of a remaining spot color image 604A that is obtained as a result of removing the parts opposed to the openings 605A, 605B, and 605C, and the cutout 605D from the spot color images 601, 602, 603, and 604, for example, as illustrated in FIG. 11.

The image generation section 215 overlaps the process color image data D3 generated by the process color image generation section 213 with the spot color image data D4 generated by the spot color image generation section 214 to thereby generate the image data D5. In a case where the image data D5 is the confirmation image data, the image generation section 215 represents the image data D5 by a plurality of process colors, a process color with a plurality of density, a process color with a plurality of patterns, or any combination thereof to allow a plurality of overlapped regions α or a plurality of non-overlapped regions β or both to be distinguished from one another.

Figure 12:
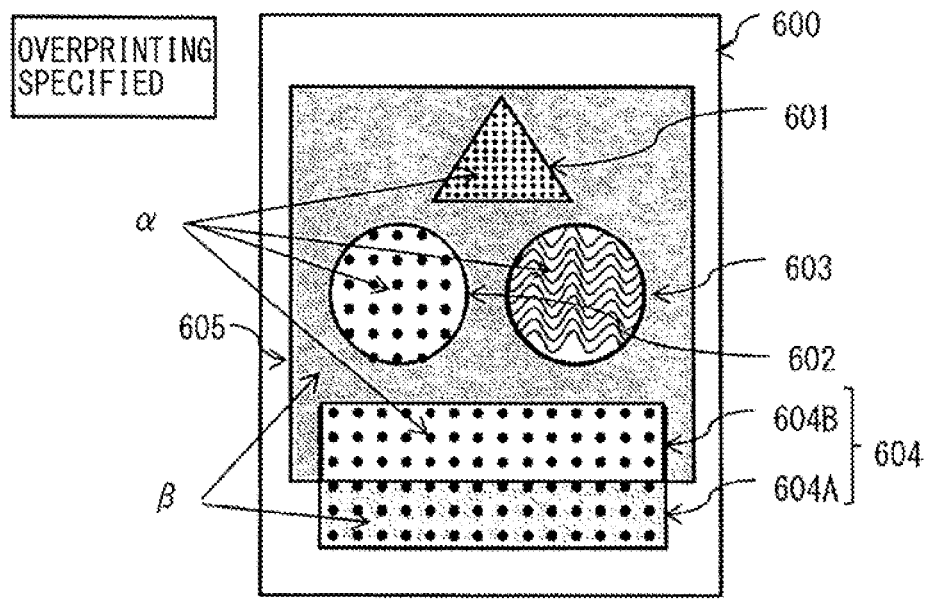
FIG. 12 is a diagram illustrating an example of confirmation image data.

When the process color image 605 and the spot color images 601, 602, 603, and 604 are to be printed in the overprinting method, the confirmation image data D5 may be image data in which the process color image data D3 of FIG. 8 is overlapped with the spot color image data D4 of FIG. 9, for example, as illustrated in FIG. 12. At this time, the confirmation image data D5 may be represented by a plurality of process colors, a process color with a plurality of density, a process color with the plurality of patterns, or any other combination thereof to allow the plurality of overlapped regions α to be distinguished from one another and to allow the plurality of non-overlapped regions β to be distinguished from one another.

Figure 11:
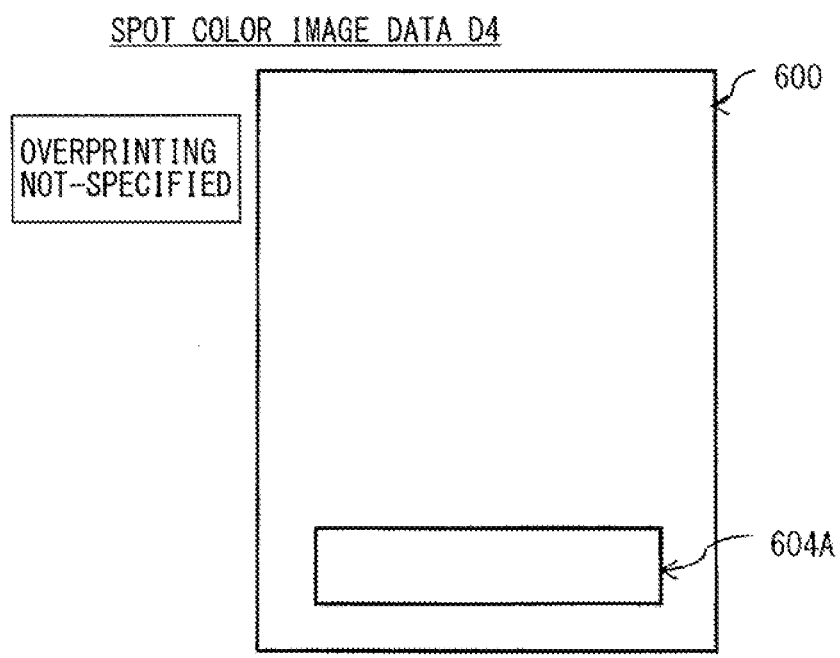
FIG. 11 is a diagram illustrating an example of the spot color image data.
Figure 13:
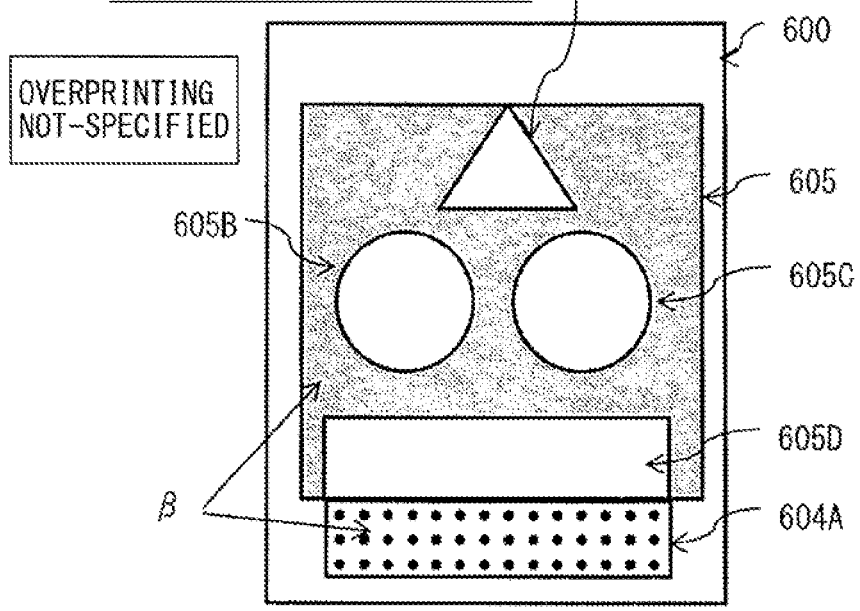
FIG. 13 is a diagram illustrating another example of the confirmation image data.

When the process color image 605 and the spot color images 601, 602, 603, and 604 are to be printed in the knockout method, the confirmation image data D5 may be image data in which the process color image data D3 of FIG. 10 is overlapped with the spot color image data D4 of FIG. 11, for example, as illustrated in FIG. 13. At this time, the confirmation image data D5 may be represented by a plurality of process colors, a process color with a plurality of density, a process color with a plurality of patterns, or any combination thereof to allow the plurality of non-overlapped regions β to be distinguished from one another.

[Host Computer 100]

The host computer 100 includes a printer driver 123 that causes the printer 200 to perform a series of operation for printing that uses a printing function of the printer 200 or for display that uses a preview function of the printer 200. The host computer 100 may include, for example, a controller 110, a memory section 120, the operation input I/F 130, a display output I/F 140, and a network I/F 150.

The network I/F 150 communicates with the printer 200 through the network 300. The network I/F 150 transmits various kinds of requests from the controller 110 to the printer 200. When receiving various kinds of responses from the printer 200, the network I/F 150 transfers the various kinds of received responses to the controller 110. The display output I/F 140 may be, for example, a display module. The display output I/F 140 displays an image on a screen, based on display screen data provided from the controller 110.

The operation input I/F 130 receives various kinds of inputs (for example, execution instruction, and data input) from a user. The operation input I/F 130 receives selection of one of items in the printer driver UI screen 400 described later in response to input from the user, for example, when the printer driver UI screen 400 is displayed on the screen of the display output I/F 140. As used herein, the wording "one of items in printer driver UI screen 400" may refer to, for example, an index tab or a print setting item. The operation input I/F 130 transfers, to the controller 110, information inputted by the user.

The memory section 120 stores a control program 121, an application 122, and the printer driver 123. The control program 121, the printer driver 123, and the application 122 may be stored in the memory section 120 through, for example, the operation input I/F 130. The memory section 120 may be configured of a non-volatile memory such as an EEPROM, a flash memory, and a variable resistance memory.

The control program 121, the application 122, and the printer driver 123 may be loaded to the controller 110. The control program 121 may be loaded to the controller 110, allowing the controller 110 to perform a series of operation described in the loaded control program 121. The application 122 may be loaded to the controller 110, allowing the controller 110 to perform a series of operation described in the loaded application 122. The printer driver 123 may be loaded to the controller 110, allowing the controller 110 to perform a series of operation described in the loaded printer driver 123. The control program 121 may be a program that controls the entire host computer 100. The application 122 may be a program that creates data such as a document, based on the input from the user through the operation input I/F 130. The application 122 calls for the printer driver 123 in response to the printing request provided from the user through the operation input I/F 130.

When the application 122 is loaded to the controller 110, the controller 110 creates data such as a document on the application 122 in accordance with the data input from the user through the operation input I/F 130. When the printer driver 123 is loaded to the controller 110 in response to the printing request from the user through the operation I/F 130, the controller 110 generates drawing data from the created data. The controller 110 converts the generated drawing data into a drawing format that depends on the printer driver 123, and stores the converted drawing data in the body of the print data D2. The controller 110 further creates display image data including a dialog screen (the printer driver UI screen 400) that is a UI of the printer driver 123, and provides the display image data to the display output I/F 140. Then, the printer driver UI screen 400 may be displayed on the screen of the display output I/F 140.

Figure 14:
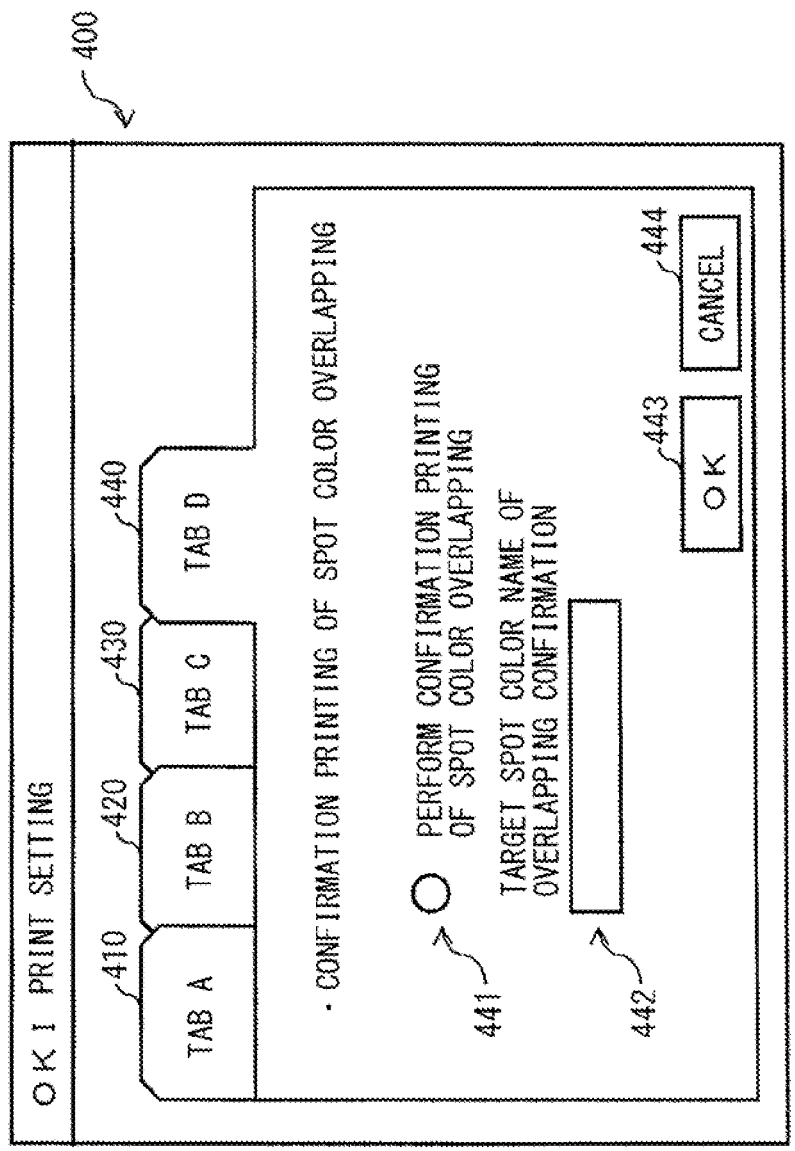
FIG. 14 is a diagram illustrating an example of a printer driver UI screen.

FIG. 14 illustrates an example of the printer driver UI screen 400. In the printer driver UI screen 400, four tabs (a tab A 410, a tab B 420, a tab C 430, and a tab D 440) are disposed, and the rightmost tab D 440 is opened. The tab A 410 to tab C 430 may be associated with various print setting items (such as layout and feeding method). The tab D 440 may be used to set confirmation printing of spot color overlapping. The tab D 440 may be provided with a radio button 441 to select confirmation printing of spot color overlapping, and an input window 442 to input a name of the spot color that is a target of overlapping confirmation.

The controller 110 may store, for example, in the header of the print data D2, the input data (for example, setting of the print condition, and setting of confirmation printing of spot color overlapping) provided from the user through the operation input I/F 130 when the printer driver UI screen 400 is displayed on the screen of the display output I/F 140. When an OK button 443 is pressed by the user, the controller 110 creates the print data D2 that includes the drawing data, the setting of the print condition, the setting of confirmation printing of spot color overlapping, etc., and transmits, together with print request, the created print data D2 to the printer 200 through the network 300.

[Operation]

Next, an image processing procedure in the printer 200 is described.

Figure 15:
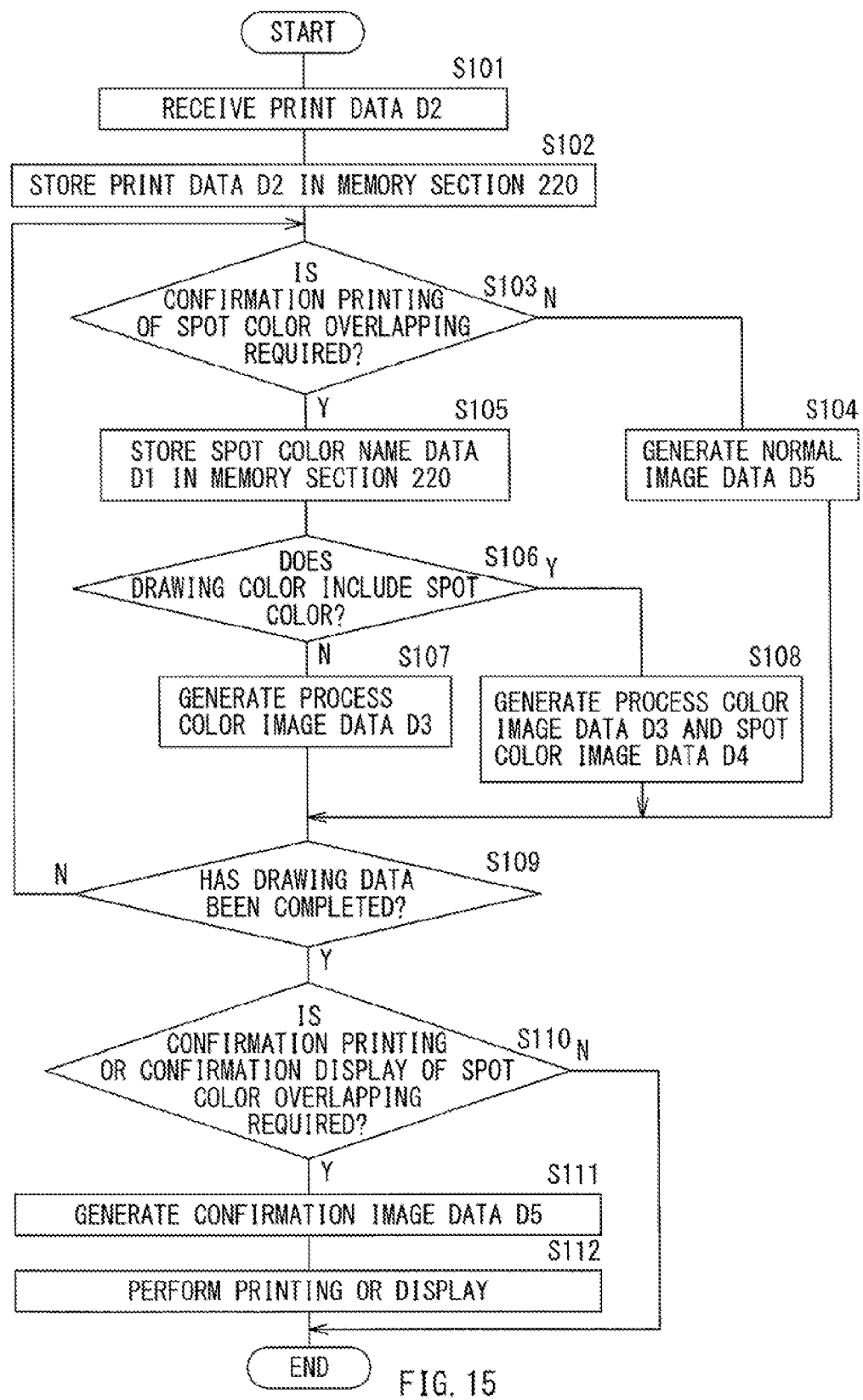
FIG. 15 is a diagram illustrating an example of an image processing procedure in the printer.

FIG. 15 illustrates an example of the image processing procedure in the printer 200. First, the user uses the operation input I/F 130 to instruct activation of the application 122. Then, the controller 110 loads and activates the application 122 stored in the memory section 120. Next, the user uses the operation input I/F 130 to instruct activation of the printer driver 123. Then, the controller 110 loads and activates the printer driver 123 stored in the memory section 120. As a result, the screen including the printer driver UI screen 400, for example, as illustrated in FIG. 14 may be displayed on the screen of the display output I/F 140. At this time, when the user uses the operation input I/F 130 to perform setting of the print condition, setting of confirmation printing of spot color overlapping, etc. and then presses the OK button 443, the controller 110 transmits, together with the print request, the print data D2 including the drawing data, the setting of the print condition, the setting of confirmation printing of spot color overlapping, etc., to the printer 200 through the network 300.

In the printer 200, the control program 221 and the image data creating program 222 have been loaded to the controller 210, for example, in association with the activation of the printer 200. Then, the print data D2 from the host computer 100 may be provided to the printer 200 through the network I/F 250. The controller 210 accordingly receives the print data D2 through the network I/F 250 (step S101). The controller 210 stores the received print data D2 in the memory section 220 (step S102).

Next, the controller 210 determines whether to perform confirmation printing of spot color overlapping (step S103). More specifically, the controller 210 reads out the print data D2 from the memory section 200, and detects whether the read print data D2 includes information relating to the confirmation printing of spot color overlapping. When the print data D2 does not include the information relating to the confirmation printing of spot color overlapping, the controller 210 generates the normal image data D5 corresponding to the print data D2 (step S104). When the print data D2 includes the information relating to the confirmation printing of spot color overlapping, the controller 210 extracts the spot color name data D1 from the print data D2 and stores the spot color name data D1 in the memory section 220 (step S105).

Next, the controller 210 determines whether drawing colors include the spot color (step S106). More specifically, the controller 210 reads out the drawing colors from the print data D2, and detects whether the read drawing colors include the spot color. When the read drawing colors do not include the spot color, the controller 210 generates the process color image data D3 from the print data D2 (step S107). When the read drawing colors include the spot color, the controller 210 generates the process color image data D3 and the spot color image data D4 from the print data D2 (step S108).

Then, the controller 210 determines whether the extraction of the drawing data from the print data D2 has been completed (step S109). When the extraction of the drawing data from the print data D2 has not been completed, the controller 210 continuously performs steps S103 to S107. When the extraction of the drawing data from the print data D2 has been completed, the controller 210 determines whether to perform printing or displaying of spot color overlapping (step S110). More specifically, the controller 210 detects whether the spot color name data D1 is stored in the memory section 220. When the spot color name data D1 is not stored in the memory section 220, the controller 210 terminates the image processing in the printer 200. When the spot color name data D1 is stored in the memory section 220, the controller 210 generates the confirmation image data D5 (step S111).

Thereafter, the controller 210 transfers the confirmation image data D5 to the engine section 260 or the display output I/F 240, in accordance with selection by the user. When transferring the confirmation image data D5 to the engine section 260, the controller 210 transfers the confirmation image data D5 to the engine section 260, and instructs the engine section 260 to perform printing that is based on the transferred data. The engine section 260 performs the printing of the image data D5 in response to the printing instruction from the controller 210. When transferring the confirmation image data D5 to the display output I/F 240, the controller 210 transfers the confirmation image data D5 to the display output I/F 240, and performs image display control that is based on the transfer data, on the display output I/F 240. The controller 210 performs the printing or the display of the confirmation image data D5 in this way, in accordance with selection by the user (step S112).

Figure 16:
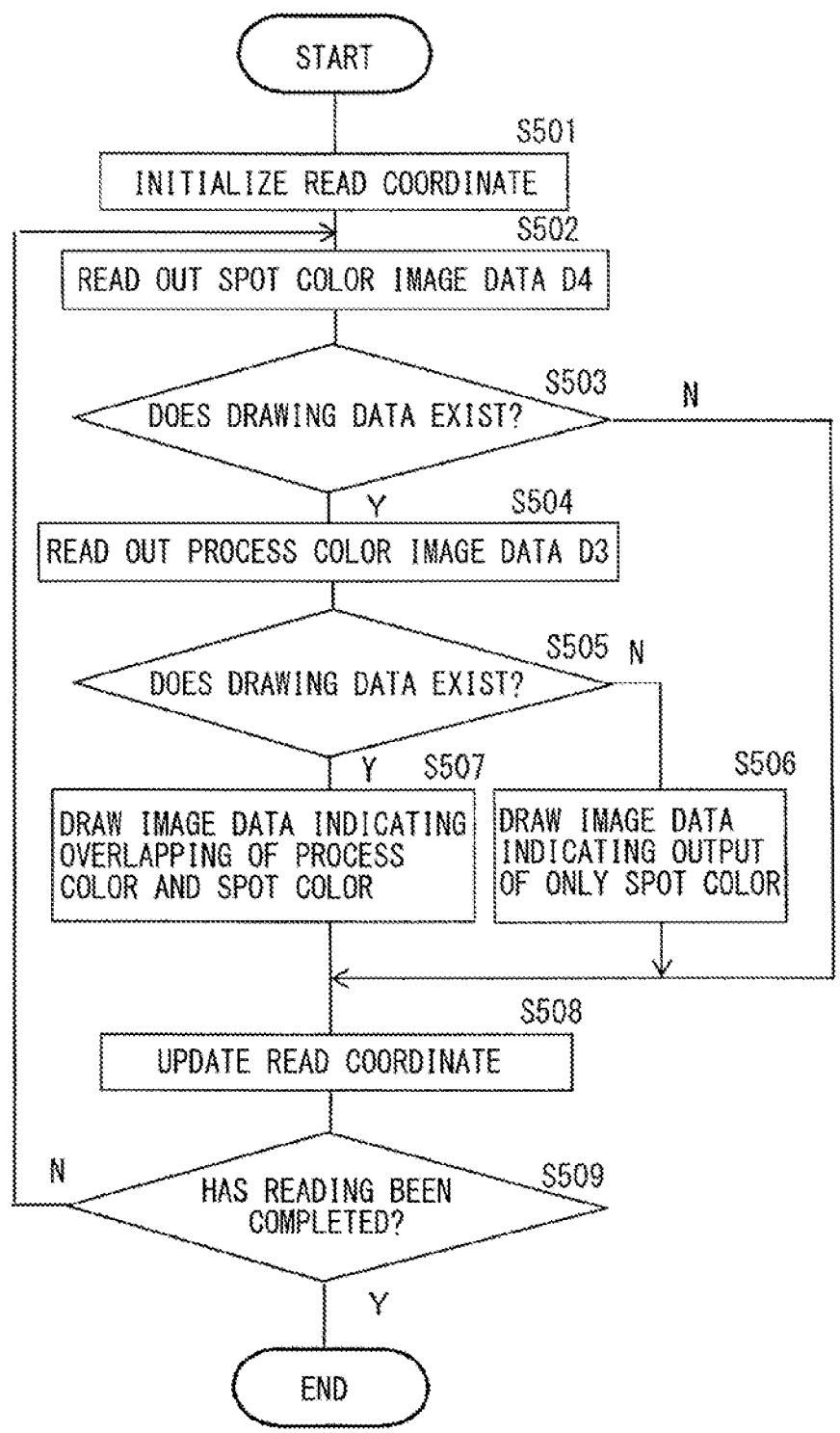
FIG. 16 is a diagram illustrating an example of a procedure of creating the confirmation image data.

Next, a procedure of creating the confirmation image data D5 is described. FIG. 16 illustrates an example of the procedure of creating the confirmation image data D5.

First, the controller 210 initializes read coordinates of the process color image data D3 and the spot color image data D4 in the memory section 220 (step S501). Next, the controller 210 reads out pixel data at a specified read coordinate (the read coordinate of the spot color image data D4) from the memory section 220 (step S502). Next, the controller 210 determines whether the read pixel data includes drawing data (step S503). When the read pixel data does not include drawing data, the read pixel data may be regarded as blank and the read coordinate may be updated (step S508).

When the read pixel data includes drawing data, the controller 210 reads out pixel data at the specified read coordinate (the read coordinate of the process color image data D3) from the memory section 220 (step S504). Next, the controller 210 determines whether the read pixel data includes drawing data (step S505). When the read pixel data does not include drawing data, image data indicating that only the spot color is to be outputted may be drawn in the read pixel data (step S506). When the read pixel data includes drawing data, image data indicating that the process color is overlapped with the spot color may be drawn in the read pixel data (step S507), and the read coordinate may be updated (step S508). When the reading is completed, the controller 210 terminates the process, and when the reading is not completed, the process returns to step S502. The confirmation image data D5 may be generated in this way.

[Effects]

Next, example effects of the printer 200 according to the first embodiment are described.

In the first embodiment, the image data D5 in which the overlapped region α or the non-overlapped region β of the process color and the spot color is represented by process colors is generated, and the generated image data D5 is printed or displayed. This eliminates consumption of expensive spot colors in test printing, and preparation of a printing apparatus provided with spot colors for test printing. In addition, even if the spot color is used for the ground, it is possible to represent that the spot color is used for the ground, by the process colors. Accordingly, it is possible to easily confirm, at low cost, the finished state when a spot color is added to the process colors.

According to the image processing apparatus of the embodiment of the invention, a first process color image is generated from the image of the overlapped region where the region of the process color image and the region of the spot color image are overlapped with each other. This makes it possible to easily confirm, at low cost, the finished state when the spot color is added to the process color.

Modifications of the image processing system of the above-described first embodiment, and an image processing system different from that of the above-described first embodiment are now described below. Note that, in the following description, the same numerals provided in the above-described first embodiment are provided to components common to those of the above-described first embodiment. In addition, components different from those in the above-described first embodiment are mainly described, and description of the components common to those of the above-described first embodiment is appropriately omitted.

2. Modifications

[Configuration]

Figure 17:
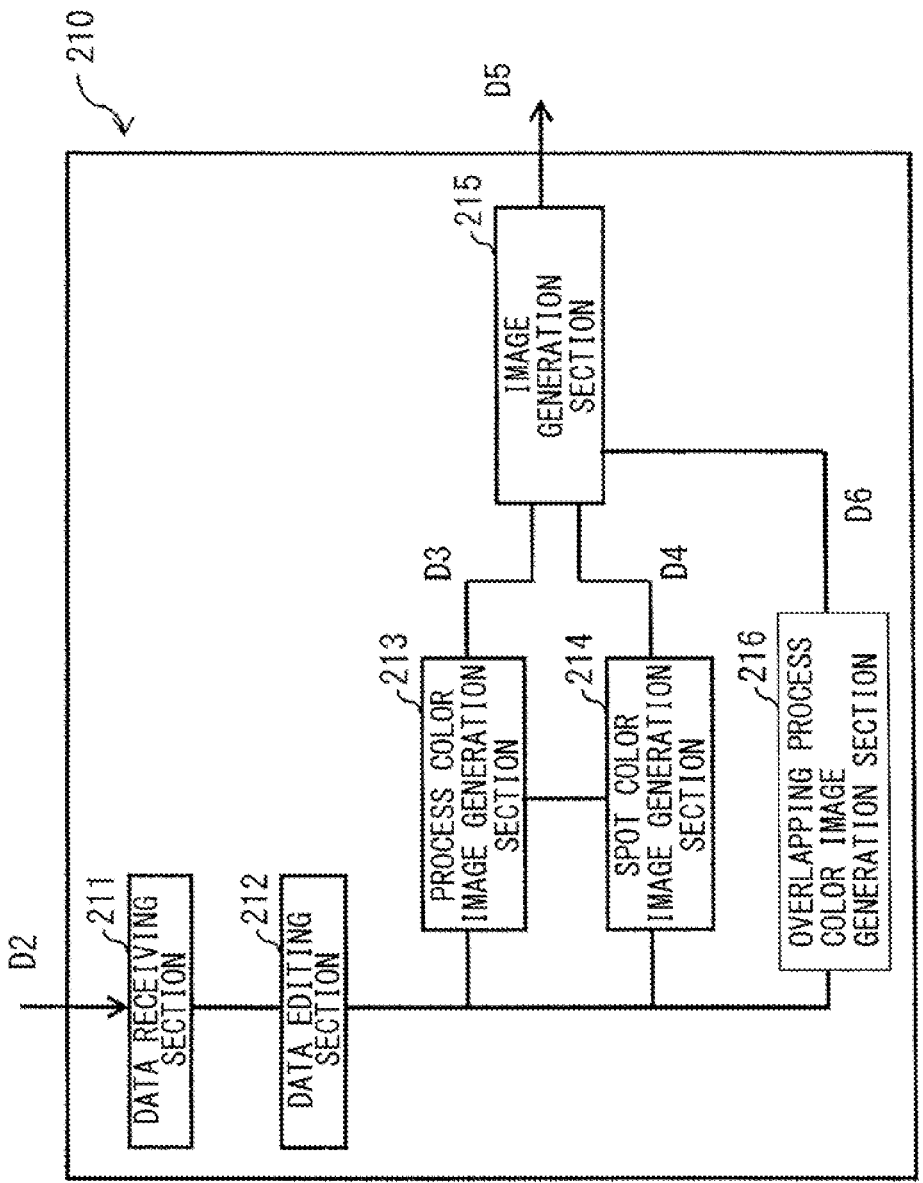
FIG. 17 is a diagram illustrating a configuration example of the functional block of the controller of the printer.

In the above-described first embodiment, the controller 210 may include an overlapping process color image generation section 216, for example, as illustrated in FIG. 17. The overlapping process color image generation section 216 generates overlapping process color image data D6, based on the process color image data D3 and the spot color image data D4. The overlapping process color image data D6 may be image data of process colors. The overlapping process color image data D6 may be image data in which a region, of the process color image data D3, overlapped with the spot color image data D4 is remained. For example, as illustrated in FIG. 18, the overlapping process color image data D6 may be image data in which regions, of the process color image data D3, overlapped with the triangular spot color image 601, the circular spot color image 602, the circular spot color image 603, and the rectangular spot color image 604 are remained.

The image generation section 215 overlaps the overlapping process color image data D6 generated by the overlapping process color image generation section 216 with the spot color image data D4 generated by the spot color image generation section 214, to generate the image data D5. In the case where the image data D5 is confirmation image data, the image generation section 215 represents the image data D5 by a plurality of process colors, a process color with a plurality of density, a process color with a plurality of patterns, or any combination thereof, to allow the plurality of overlapped regions to be distinguished from one another and to allow the plurality of non-overlapped regions to be distinguished from one another.

Figure 18:
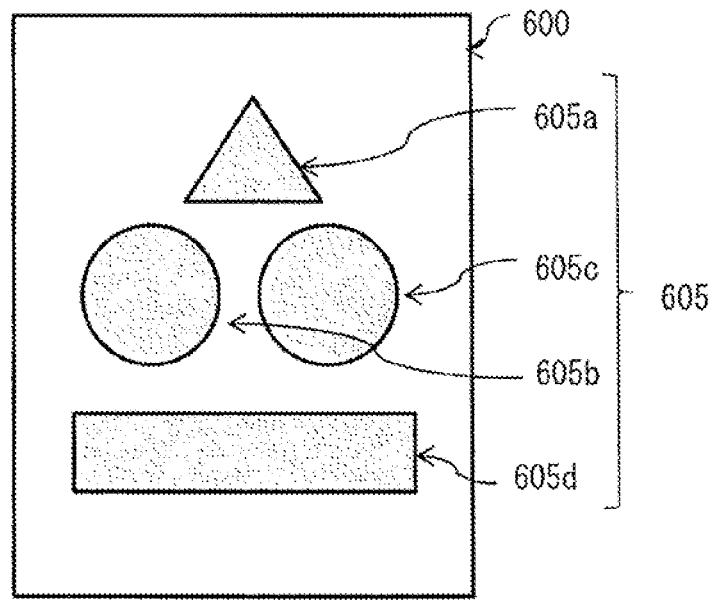
FIG. 18 is a diagram illustrating an example of overlapping process image data.
Figure 19:
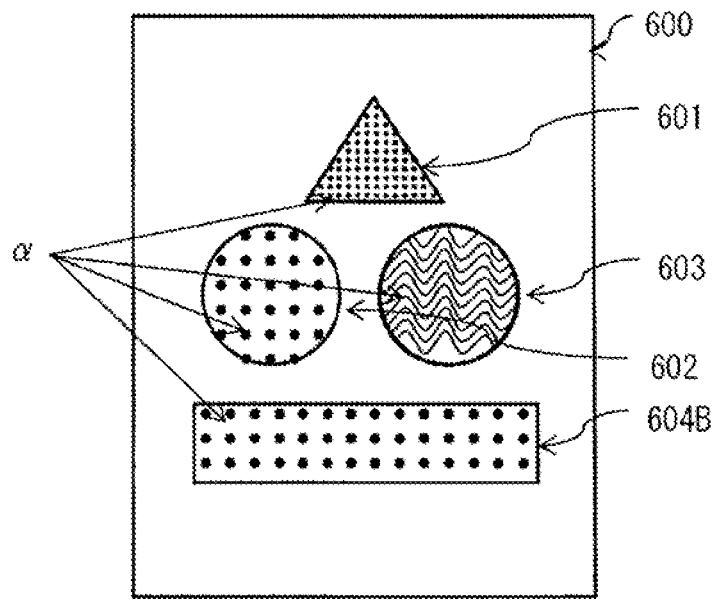
FIG. 19 is a diagram illustrating an example of the confirmation image data.

When the overlapping process color image data D6 and the spot color images 601, 602, 603, and 604 are to be printed in the overprinting method, the confirmation image data D5 may be image data in which the overlapping process color image data D6 of FIG. 18 is overlapped with the spot color image data D4 of FIG. 9, for example, as illustrated in FIG. 19. At this time, the confirmation image data D5 may be represented by a plurality of process colors, a process color with a plurality of density, a process color with a plurality of patterns, or any combination thereof to allow the plurality of overlapped regions α to be distinguished from one another.

[Operation]

Figure 20:
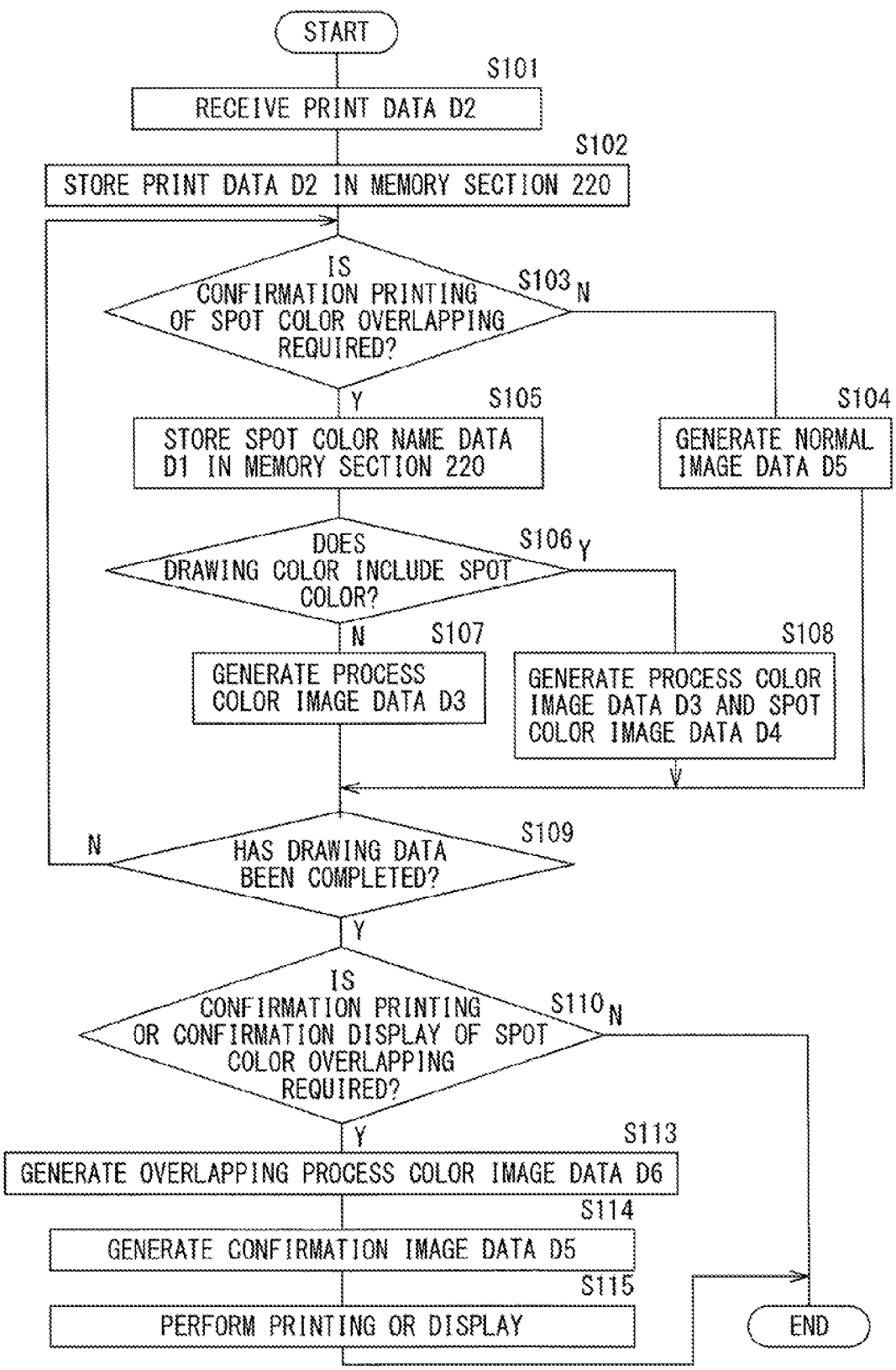
FIG. 20 is a diagram illustrating an example of the procedure of creating the confirmation image data.

Next, the image processing procedure in the printer 200 is described. FIG. 20 illustrates an example of the image processing procedure in the printer 200. Note that the image processing procedure in the present modification may include steps common to the steps S101 to S110 in the above-described first embodiment. Therefore, steps subsequent thereto are described below.

When the extraction of the drawing data from the print data D2 has been completed, the controller 210 determines whether to perform printing or display of the spot color overlapping (step S110). More specifically, the controller 210 detects whether the spot color name data D1 is stored in the memory section 220. When the spot color name data D1 is not stored in the memory section 220, the controller 210 terminates the image processing in the printer 200. When the spot color name data D1 is stored in the memory section 220, the controller 210 generates the overlapping process color image data D6 (step S113), and generates the confirmation image data D5 with use of the overlapping process color image data D6 (step S114).

Thereafter, the controller 210 transfers the confirmation image data D5 to the engine section 260 or the display output I/F 240, in accordance with selection by the user. When transferring the confirmation image data D5 to the engine section 260, the controller 210 transfers the confirmation image data D5 to the engine section 260 and instructs the engine section 260 to perform printing that is based on the transferred data. The engine section 260 performs the printing of the image data D5 in response to the printing instruction from the controller 210. When transferring the confirmation image data D5 to the display output I/F 240, the controller 210 transfers the confirmation image data D5 to the display output I/F 240 and performs image display control that is based on the transferred data, on the display output I/F 240. The controller 210 performs printing or display of the confirmation image data D5 in this way, in accordance with selection by the user (step S115).

[Effects]

Next, effects of the printer 200 according to the present modification are described.

In the present modification, the image data D5 in which the overlapped region α or the non-overlapped region β of the process colors and the spot colors is represented by the process colors is generated, and the generated image data D5 is printed or displayed, as with the above-described embodiment. This eliminates consumption of expensive spot colors in test printing, and preparation of a printing apparatus provided with spot colors for test printing. In addition, even if the spot color is used for the ground, it is possible to represent that the spot color is used for the ground, by the process colors. Accordingly, it is possible to easily confirm, at low cost, the finished state when the spot color is added to the process color.

3. Second Embodiment

Figure 21:
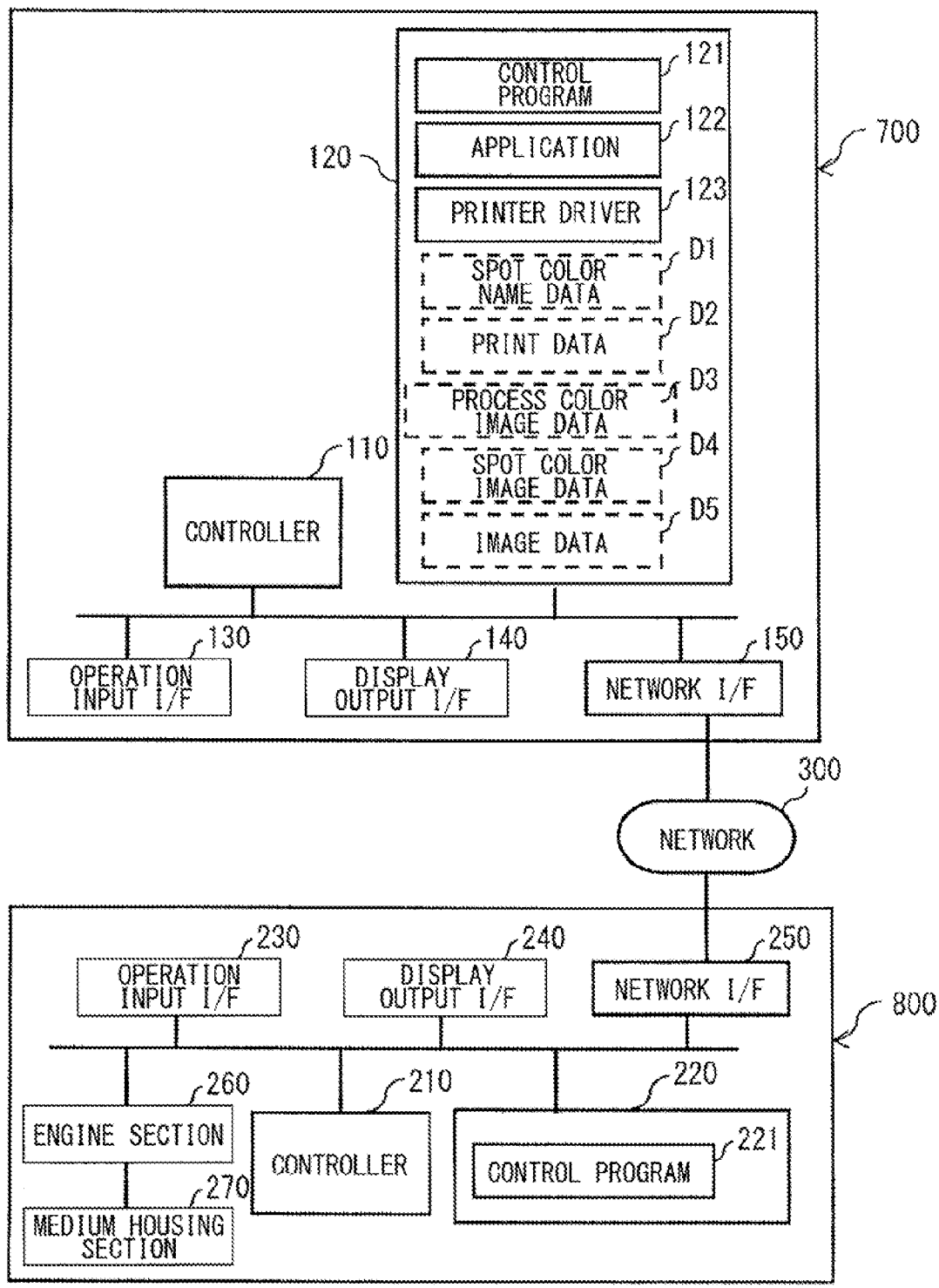
FIG. 21 is a diagram illustrating an example of an outline configuration of the image processing system.

FIG. 21 illustrates an example of an outline configuration of an image processing system. The image processing system includes a host computer 700 and a printer 800. The host computer 700 may be configured of a device such as a personal computer and a mobile terminal. The host computer 700 corresponds to an "image processing apparatus" in one embodiment of the invention. The host computer 700 and the printer 800 may be coupled to each other through the network 300. The host computer 700 may be communicatable with the printer 800 through the network 300. The printer 800 may be communicatable with the host computer 700 through the network 300.

In the host computer 700, the memory section 120 stores the spot color name data D1, the print data D2, the process color image data D3, the spot color image data D4, and the image data D5. In addition, in the host computer 700, the printer driver 123 has the function of the image data creating program 222 of the first embodiment. In the host computer 700, the printer 800 corresponds to the printer 200 of the first embodiment in which the image data creating program 222, the spot color name data D1, the print data D2, the process color image data D3, the spot color image data D4, and the image data D5 are omitted from the memory section 220.

In the second embodiment, when the printer driver 123 is loaded to the controller 110, the controller 110 performs a series of operation, similar to that of the image data creating program 222, described in the printer driver 123. After creating the print data D2, the controller 110 performs a series of operation similar to that of the image data creating program 222 to generate the image data D5. The controller 110 may transmit the generated image data D5 to the printer 200, for example, through the network 300. The controller 110 may generate, for example, display screen data including the generated image data D5, and transfer the generated display screen data to the display output I/F 140. The display output I/F 140 may perform screen display, based on, for example, the display screen data (the image data D5) provided from the controller 110.

When receiving the image data D5 from the host computer 700, for example, the printer 800 (the controller 210) may transfer the image data D5 to the engine section 260 and instruct the engine section 260 to perform printing that is based on the transferred data. The engine section 260 performs printing of the image data D5 in response to the printing instruction from the controller 210.

When receiving the image data D5 from the host computer 700, for example, the printer 800 (the controller 210) may generate display screen data including the image data D5, and transfer the generated display screen data to the display output I/F 240. The display output I/F 240 displays an image on the screen, based on the display screen data provided from the controller 210.

In the second embodiment, the image data D5 in which the overlapped region α or the non-overlapped region β of the process colors and the spot colors is represented by the process colors is generated, and the generated image data D5 is printed or displayed, as with the first embodiment. This eliminates consumption of expensive spot colors in test printing, and preparation of a printing apparatus provided with spot colors for test printing. In addition, even if the spot color is used for the ground, it is possible to represent that the spot color is used for the ground, by the process colors. Accordingly, it is possible to easily confirm, at low cost, the finished state when the spot color is added to the process color.

4. Third Embodiment

Figure 22:
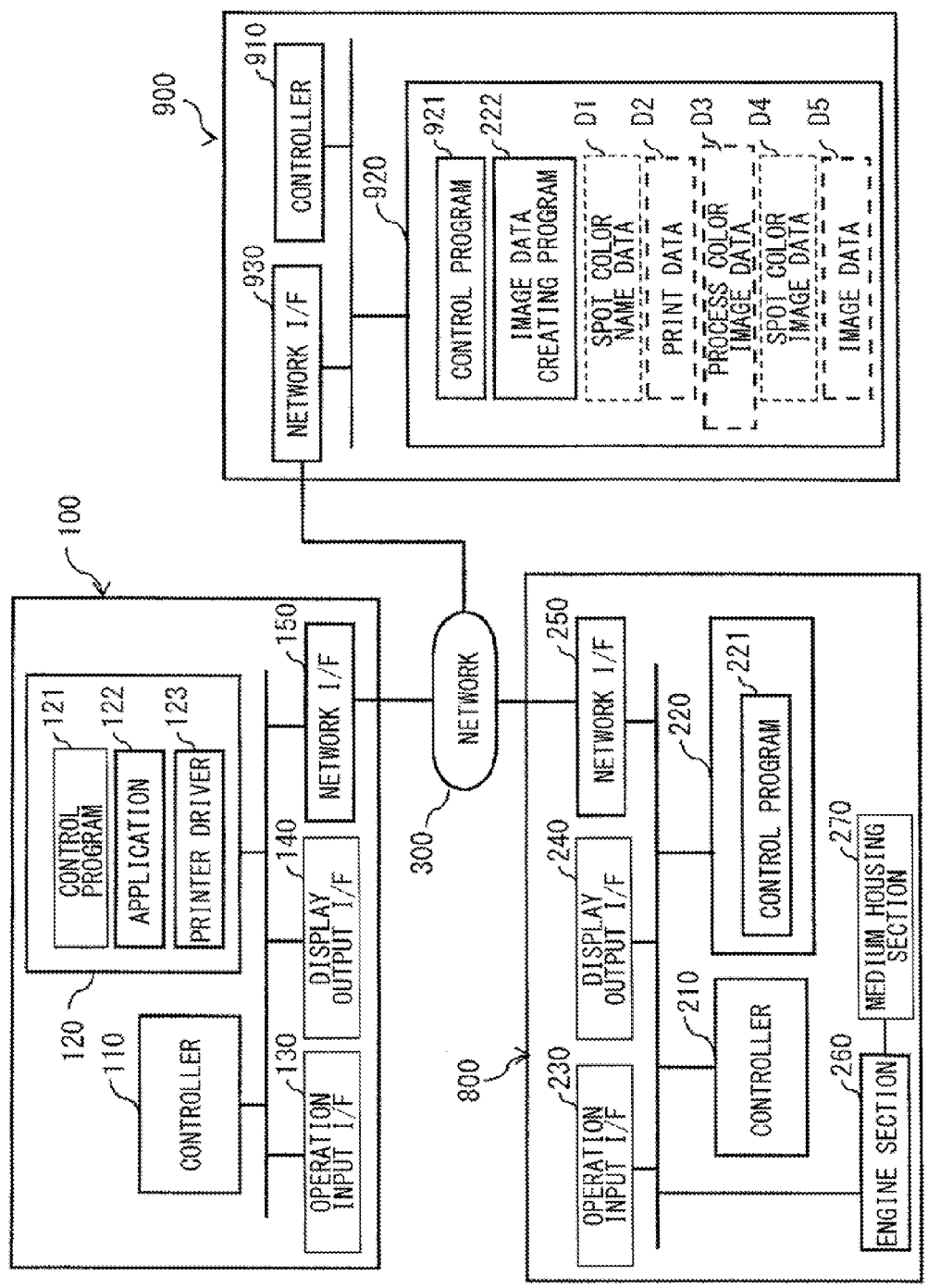
FIG. 22 is a diagram illustrating another example of the outline configuration of the image processing system.

FIG. 22 illustrates an example of an outline configuration of an image processing system. The image processing system includes the host computer 100, the printer 800, and a server 900. The server 900 may be configured of a device such as a personal computer and a mobile terminal. The server 900 corresponds to an "image processing apparatus" in one embodiment of the invention. The host computer 100, the printer 800, and the server 900 may be coupled to one another through the network 300. The host computer 100 may be communicatable with the server 900 through the network 300. The printer 800 may be communicatable with the server 900 through the network 300.

[Server 900]

The server 900 includes the image data creating program 222 that causes the printer 800 to perform a series of operation for printing that uses the printing function of the printer 800 or for display that uses a preview function of the printer 800. The server 900 may include, for example, a controller 910, a memory section 920, and a network I/F 930.

The network I/F 930 communicates with the host computer 100 or the printer 800 through the network 300. The network I/F 930 transmits various kinds of requests from the controller 910 to the printer 800. When receiving various kinds of responses from the printer 800, the network I/F 930 transfers the various kinds of received responses to the controller 910. The memory section 920 stores a control program 921 and the image data creating program 222. The memory section 920 may be configured of a non-volatile memory such as an EEPROM, a flash memory, and a variable resistance memory.

The control program 921 and the image data creating program 222 may be loaded to the controller 910. The control program 921 may be loaded to the controller 910, allowing the controller 910 to perform a series of operation described in the loaded control program 921. The image data creating program 222 may be loaded to the controller 910, allowing the controller 910 to perform a series of operation described in the loaded image data creating program 222. The control program 921 may be a program controlling the entire server 900. When the image data creating program 222 is loaded to the controller 910, the controller 910 receives the print data D2 from an external apparatus such as the host computer 100 through the network I/F 930. The controller 910 performs the series of operation described in the image data creating program 222 to generate the image data D5 from the received print data D2. The controller 210 may transmit, for example, the generated image data D5 to the printer 800 or the host computer 100 through the network I/F 930. The controller 910 corresponds to a "data acquiring circuitry" and an "image generating circuitry" in one embodiment of the invention.

[Printer 800]

When receiving the image data D5 from the server 900, the printer 800 (the controller 210) may transfer, for example, the image data D5 to the engine section 260, and instruct the engine section 260 to perform printing that is based on the transferred data. The engine section 260 performs printing of the image data D5 in response to the printing instruction from the controller 210.

When receiving the image data D5 from the server 900, the printer 800 (the controller 210) may generate, for example, display screen data including the image data D5, and transfer the generated display screen data to the display output I/F 240. The display output I/F 240 displays an image on the screen, based on the display screen data supplied from the controller 210.

[Host Computer 100]

When receiving the image data D5 from the server 900, the host computer 100 may generate, for example, the display screen data including the image data D5, and transfer the generated display screen data to the display output I/F 140. The display output I/F 140 displays an image on the screen, based on the display screen data provided from the controller 110.

In the third embodiment, the image data in which the overlapped region α or the non-overlapped region β of the process colors and the spot colors is represented by the process colors is generated and the generated image data D5 is printed or displayed, as with the above-described embodiments. This eliminates consumption of expensive spot colors in test printing, and preparation of a printing apparatus provided with spot colors for test printing. In addition, even if the spot color is used for the ground, it is possible to represent that the spot color is used for the ground, by the process colors. Accordingly, it is possible to easily confirm, at low cost, the finished state when the spot color is added to the process color.

Note that the series of processes described in the above-described embodiments and the modifications thereof may be executed by hardware (circuitry, processor, etc.) or by software (program). When the series of processes are executed by software, the software may be configured of a program group that causes a computer to execute various functions. Each of the programs may be previously incorporated in, for example, the above-described computer, or may be installed in the above-described computer from a network or a storage medium for use.

Furthermore, the invention encompasses any possible combination of some or all of the various embodiments and the modifications described herein and incorporated herein.

It is possible to achieve at least the following configurations from the above-described example embodiments of the invention.

(1) An image processing apparatus, including:
a data acquiring circuitry that acquires image formation data, the image formation data including an image of a process color as a process color image and an image of a spot color as a spot color image; and
an image generating circuitry that detects, from the image formation data acquired by the data acquiring circuitry, an overlapped region in which a region of the process color image and a region of the spot color image are overlapped with each other, and generates a first process color image from an image of the overlapped region.

(2) The image processing apparatus according to (1), wherein the image generating circuitry generates a second process color image in which the overlapped region is removed from the process color image.

(3) The image processing apparatus according to (2), wherein the first process color image and the second process color image are made distinguishable from each other.

(4) The image processing apparatus according to (1), wherein the image generating circuitry generates the first process color image when the data acquiring circuitry acquires an instruction on confirmation of overlapping of the spot color.

(5) The image processing apparatus according to (1), wherein the image generating circuitry generates the first process color image when the data acquiring circuitry acquires an instruction on overprinting.

(6) The image processing apparatus according to (1), wherein
the process color is represented by one or more of cyan, magenta, yellow, and black, and
the spot color is represented by one or more of colors that are out of a color reproduction range derived from the process color.

(7) The image processing apparatus according to (1), wherein the image generating circuitry detects, from the image formation data acquired by the data acquiring circuitry, a non-overlapped region in which the region of the process color image and the region of the spot color image are not overlapped with each other, and generates a third process color image from an image of the non-overlapped region.

(8) The image processing apparatus according to (7), wherein the third process color image is different from the first process color image in one of color, density, and pattern.

Although the invention has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. An image processing apparatus, comprising:
a data acquiring circuitry that acquires image formation data, the image formation data including an image of a process color as a process color image and an image of a spot color as a spot color image; and
an image generating circuitry that detects, from the image formation data acquired by the data acquiring circuitry, an overlapped region in which a region of the process color image and a region of the spot color image are overlapped with each other, and generates a confirmation image,
the image generating circuitry generating the confirmation image by, where the data acquiring circuitry acquires an instruction on confirmation of overlapping of the spot color, changing a method of forming an image to be formed in the overlapped region between when the data acquiring circuitry acquires an instruction on overprinting and when the data acquiring circuitry acquires an instruction on printing that is other than the overprinting.

2. The image processing apparatus according to claim 1, wherein
the image generating circuitry generates the confirmation image in which the image to be formed in the overlapped region is represented by the process color, where the data acquiring circuitry acquires the instruction on the confirmation of the overlapping of the spot color and when the data acquiring circuitry acquires the instruction on the overprinting, and
the image generating circuitry generates the confirmation image in which the image in the overlapped region is removed, where the data acquiring circuitry acquires the instruction on the confirmation of the overlapping of the spot color and when the data acquiring circuitry acquires the instruction on the printing that is other than the overprinting.

3. The image processing apparatus according to claim 1, wherein
the process color is represented by one or more of cyan, magenta, yellow, and black, and
the spot color is represented by one or more of colors that are out of a color reproduction range derived from the process color.

4. The image processing apparatus according to claim 1, wherein the image generating circuitry detects, from the image formation data acquired by the data acquiring circuitry, a non-overlapped region in which the region of the process color image and the region of the spot color image are not overlapped with each other, and generates the confirmation image in which the overlapped region and the non-overlapped region are made distinguishable from each other.

5. The image processing apparatus according to claim 4, wherein the image to be formed in the overlapped region is different from an image to be formed in the non-overlapped region in one of color, density, and pattern.

* * * * *